United States Patent [19]

Shank

[11] 4,341,810

[45] Jul. 27, 1982

[54] GELLED GELATIN FOOD PRODUCT PREPARED FROM NON-GELLED AQUEOUS GELATIN COMPOSITIONS

[75] Inventor: Joseph L. Shank, Matteson, Ill.

[73] Assignee: Dynagel Incorporated, Calumet City, Ill.

[21] Appl. No.: 295,795

[22] Filed: Aug. 27, 1981

[51] Int. Cl.$^3$ .............................................. A23L 1/04
[52] U.S. Cl. .................................... 426/576; 426/106
[58] Field of Search ......................................... 426/576

[56] References Cited

U.S. PATENT DOCUMENTS

| | | | |
|---|---|---|---|
| 2,838,402 | 6/1958 | Steigmann | 426/576 |
| 3,108,995 | 10/1963 | Tourtellotte et al. | 426/576 |
| 3,362,832 | 1/1968 | Kalafabas et al. | 426/576 |
| 3,763,138 | 10/1973 | Rakoczy et al. | 426/576 |
| 3,930,050 | 12/1975 | Faber | 426/576 |
| 4,224,353 | 9/1980 | Keuper | 426/576 |

FOREIGN PATENT DOCUMENTS 888643 1/1962 United Kingdom ................ 426/576

*Primary Examiner*—Jeanette M. Hunter
*Attorney, Agent, or Firm*—Dressler, Goldsmith, Shore, Sutker & Milnamow, Ltd.

[57] ABSTRACT

A method of preparing a gelled food product from an ungelled aqueous concentrate containing 10–30 weight percent gelatin and a urea is disclosed. The concentrate has a gelatin-to-urea weight ratio of 1:0.3 to 1:1.5, a pH value of 2.5–7 and gels at less than 20°C. On dilution with water to a gelatin concentration of about 2 weight percent while maintaining substantially the pH value of the concentrate, the diluted composition gels at a temperature above that of the concentrate. Specific concentrates, gelled food products, food product precursor products, and methods for using the concentrates are disclosed.

38 Claims, 5 Drawing Figures

GEL-SET TEMPERATURES OF GELATIN CONCENTRATES AND DILUTED COMPOSITIONS PREPARED THEREFROM

| COMPOSITION | % GELATIN | % LYOTROPE | G:L |
|---|---|---|---|
| A | 28 | — | — |
| A/10 | 2.8 | — | — |
| B | 28 | 20 | 1:0.7 |
| B/10 | 2.8 | 2 | 1:0.7 |
| C | 28 | 20 | 1:0.7 |
| C/10 | 2.8 | 2 | 1:0.7 |
| D | 32 | 15.1 | 1:0.4 |
| D/10 | 3.2 | 1.51 | 1:0.4 |

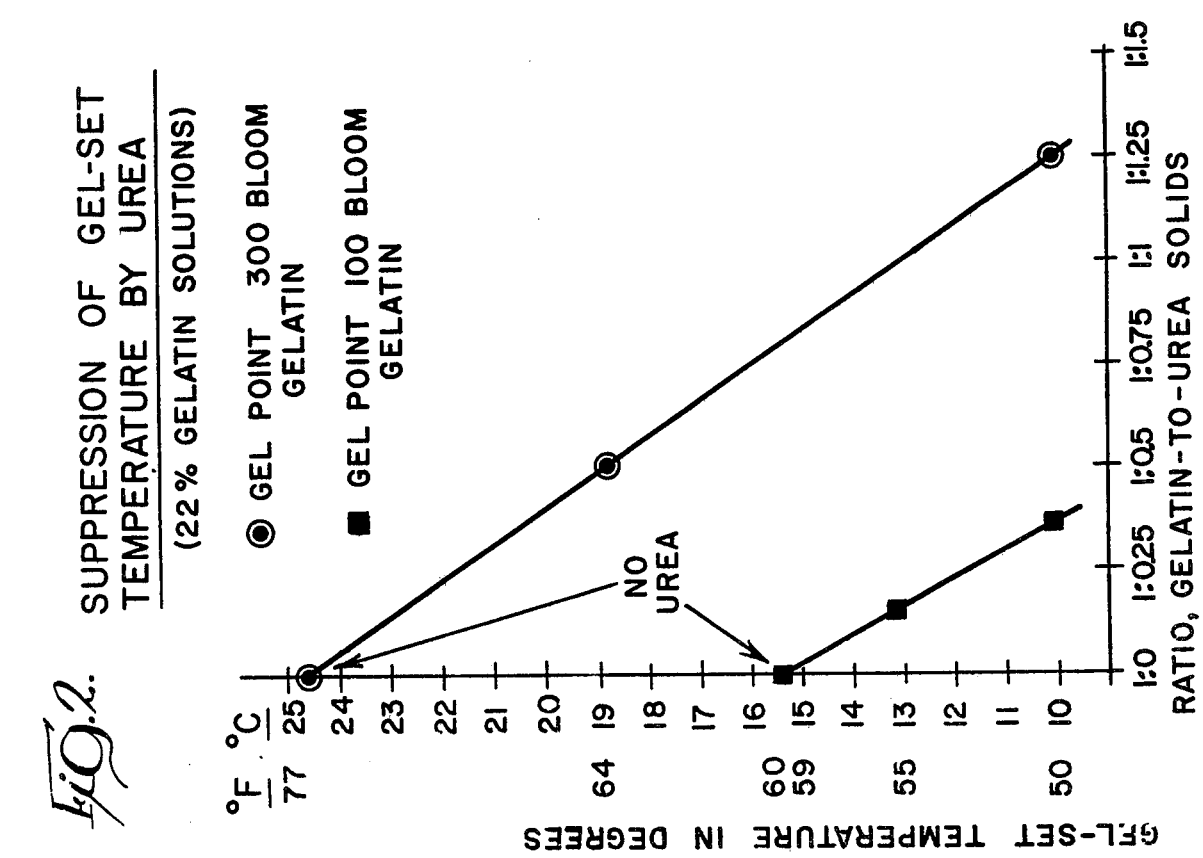

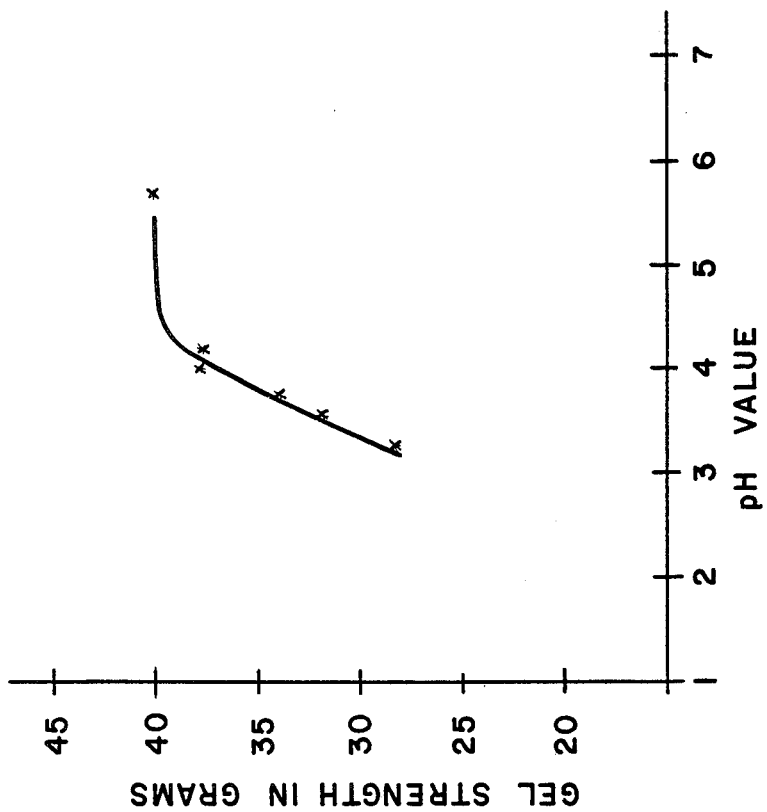
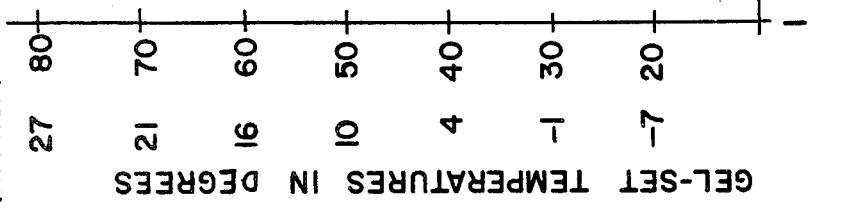

GELLED GELATIN FOOD PRODUCT PREPARED FROM NON-GELLED AQUEOUS GELATIN COMPOSITIONS

DESCRIPTION

TECHNICAL FIELD

This invention relates to gelatin compositions, and particularly to gelled food products which are prepared from non-gelled, liquid, aqueous gelatin concentrates.

BACKGROUND ART

Gelatin is a proteinaceous material derived from collagen by hydrolytic action which is produced at a purity suitable for edible consumption. Gelatin is soluble or dispersible in hot water, and can swell to take-up about 5–10 times its own weight of water to form a gel. It is useful for the preparation of food products, such as desserts, photochemical tissue for rotogravure printing, subbings for photographic film, sizing for textiles and papers, and the like. With the exception of its use in adhesives, where gelatin may comprise about 30 to about 50 weight percent of the product composition, gelatin is typically used at a concentration of about 0.25 to about 25 weight percent of an aqueous composition.

In some uses, the gelatin composition is used in relatively large, gelled blocks, as in a dessert, while in other uses, it is utilized as an extremely thin, gelled film, as in a photographic subbing. When used in adhesives, the gelatin composition is normally a liquid at the time of ultimate use.

Gelled food products, such as desserts, typically contain about 1 to about 3.5 weight percent gelatin along with various other ingredients such as one or more food acids for tartness, sweetener and flavorant. Non-dessert gelled food products, such as aspics, also contain about 1 to about 3.5 weight percent gelatin with flavor containing materials, such as tomato juice, beef broth, or clam broth, and usually common table salt. These compositions typically gel at temperatures less than about 70° F. (about 20° C.), and are usually refrigerated at temperatures of about 50°–55° F. (about 10°–13° C.) to initiate gelation. Other gelatin-containing food products such as marshmallows, head cheese, canned hams and ice milks generally contain from about 0.25 to about 15 weight percent gelatin, based upon the weight of the water present, along with the usually used flavorants such as sweeteners and spices.

A difficulty arising from the use of gelatin compositions stems from the fact that dry gelatin is not readily soluble in cold or tepid water. Rather, the dry gelatin must be heated and agitated with water to a temperature of about 50°–60° C. so that it will dissolve.

Concentrated gelatin solutions containing about 10 to about 60 weight percent gelatin can be made, but these solutions gel at temperatures above ambient room temperature, and once gelled, they must be reheated and agitated during the dilution step as gelled gelatin compositions are not soluble in cold or tepid water. It would therefore be advantageous if a storage stable, readily dilutable, concentrated, liquid gelatin solution could be prepared which would need no heating step for its dilution and consequently also need less agitation and cooling to be in a usable condition.

The use of liquefying agents or lyotropic agents in adhesives containing relatively high concentrations of hydrolyzed collagen; i.e., about 30–50 weight percent, has been known for sometime. For example, U.S. Pat. No. 1,394,654, No. 1,844,679, No. 1,873,580, No. 1,950,483, No. 2,048,499, No. 2,126,305 and No. 2,658,001 teach that thiourea, urea, biuret, alkali metal nitrates, dextrines, infusorial or diatomaceous earth, alkaline earth salicylates, ethyl alcohol, glycerol, furfuryl or tetrahydrofurfuryl alcohols, 2-methoxy methanol, thiocyanate salts and the like are useful to lower the gelling temperature of various hydrolyzed collagen-containing compositions. In addition, U.S. Pat. No. 2,413,815, states that boiling a gelatin solution with phosphoric acid at a composition pH value of less than 5.7, followed by neutralization with calcium carbonate to a pH value between 5.7 and 5.9 and filtration, leads to a composition which may contain more than 20 weight percent gelatin and still remain liquid down to the temperature at which the solvent congeals.

A more recent patent, U.S. Pat. No. 4,224,353, acknowledging the known lyotropic effect of acid pH values upon aqueous gelatin solutions, teaches that gellable aqueous gelatin-containing dessert starter compositions can be prepared using an acid as the lyotropic agent. The syrups of that invention are said to be suitably prepared containing from about 5 to 40 percent gelatin, from about 5 to about 40 percent acid and from about 20 to 90 percent water, with the acid present at about 30–200 percent of the weight of the gelatin. The dessert starter compositions gel to form the final dessert products when they are mixed with sufficient buffer to raise the pH of the dessert composition to about 3.6 to 4.6. Water is also be added to achieve the desired gelatin concentration of ingredients.

The compositions of the above patent are, however, said to deteriorate on storage at room temperature due to hydrolysis of the gelatin protein under acid conditions. Those gelatin-containing syrups are therefore preferably stored and sold in a refrigerated or frozen form along with the neutralizing buffer salts.

Aside from the lack of convenience of the products of the above patent due to their storage under refrigerated conditions, the food product made using the proportions of ingredients set out in its sole Example was found to have a metallic taste. It is presumed that the taste so found arose from the relatively high amount of buffer salt needed to raise the composition to the proper pH value for gelling. That product also contains a relatively high sugar content, also presumably to help mask the metallic flavor.

None of the above-described art teaches or suggests that room temperature storage stable, ungelled gelatin-containing concentrates can be prepared using a non-acid lyotrope, and then diluted with water to form gelled gelatin-containing food products which gel at temperatures above the gelling temperature of the concentrate, and at temperatures similar to product compositions containing the same amount of gelatin and no lyotropic agent, as is taught hereinbelow.

BRIEF SUMMARY OF THE INVENTION

A novel gelatin concentrate, its method of use and novel gelled food products are disclosed. The concentrate of this invention is ungelled at ambient temperatures and has a gel-set temperature of less than about 20° C. It contains about 10 to about 30 weight percent gelatin, urea as a lyotropic agent, and flavorant or other ingredient. Its pH value can range from about 2.5 to about 7.5, the lower values, when present, being attained through materials other than the lyotropic agent.

The ratio of gelatin-to-urea in the concentrate is about 1:0.3 to about 1:1.5. The concentrates of this invention have the property whereby dilution of the concentrate with water to a gelatin concentration of about 2 weight percent of the composition while maintaining the pH value of the concentrate produces a resulting diluted composition which has a gel-set temperature higher than that of the concentrate from which it is prepared.

In the method of this invention, a gelled gelatin-containing food product is prepared by providing a concentrate of this invention which is diluted to a gelatin concentration of from about 1 to about 5 weight percent of the composition. The diluted composition is then maintained at a temperature not higher than the diluted composition gel-set temperature for a period of time sufficient to produce a gelled food product of this invention.

A gelled food product of this invention contains water, about 1 to about 5 weight percent gelatin and urea, the weight ratio of gelatin to urea being about 1:0.3 to about 1:1.5.

One of the several advantages and benefits of the instant invention is that a concentrated gelatin-containing composition is prepared in ungelled, dilutable form which can be diluted with water without heating to provide gelatin at a concentration which is suitable for gelled gelatin food products. This permits quick and easy usage.

Another advantage of the instant invention is that while the concentrate does not gel at normal temperatures, once the concentrate is diluted to a gelatin concentration of about 1 to about 5 weight percent, the diluted composition gels at a temperature similar to that of a composition containing the same amount of gelatin of the same Bloom strength but containing no lyotropic agent.

Another benefit of the concentration of this invention is that they can be stored for months at room temperature without appreciable hydrolysis of the gelatin or detriment to the resulting gelled product.

Yet another benefit of this invention is that it permits use of aqueous liquid gelatin concentrates at temperatures below the freezing point of water which form gelled products at the same, sub-freezing temperature upon dilution.

Several other benefits and advantages of the instant invention will become manifest from the detailed description which follows.

BRIEF DESCRIPTION OF THE DRAWINGS

In the drawings, forming a portion of the disclosure of this invention;

FIG. 2 is a graph showing a plot of gel-set temperatures for aqueous compositions containing 22 weight percent gelatin and varying amounts of urea, the abscissa being in units of the weight ratio of gelatin-to-urea;

FIG. 3 is a graph showing a plot of gel-set temperatures for a constant amount of gelatin, and constant gelatin-to-urea weight ratio versus the Bloom value of the gelatin used to prepare the concentrate;

FIG. 4 is a graph showing the effect of pH value on gel-set temperature for gelatin concentrates of this invention; and FIG. 5 is a graph showing the effect of pH value on the gel strength for concentrates of this invention which have been diluted to form gelled products.

DETAILED DESCRIPTION OF THE INVENTION

Figure 1:
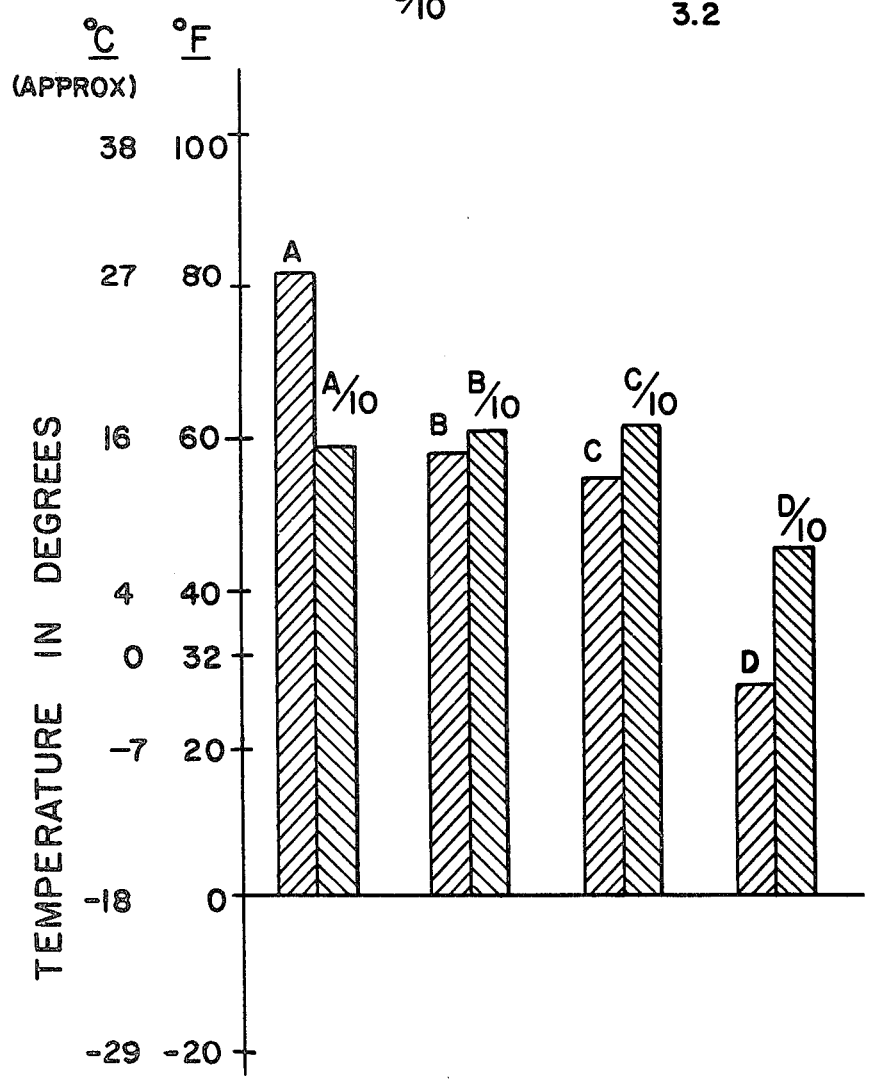
FIG. 1 is a graph showing a comparison of gel-set temperatures of concentrated and diluted (to one tenth) aqueous compositions containing gelatin alone or containing various percentages of gelatin of the same Bloom value and various percentages of urea as a lyotropic agent.

The present invention relates to a method of preparing gelled gelatin food products from liquid, aqueous gelatin concentrates which remain fluid at ambient temperature, as well as to the concentrates themselves, and to gelled food products. Upon merely diluting the concentrates with water to a gelatin concentration of from about 1 to about 5 weight percent, the resulting diluted compositions form firm gels at ambient temperatures although gel rigidity is improved by refrigeration.

It is well known that increasing the gelatin concentration in an aqueous composition causes the composition to gel more easily (i.e. raises the temperature at which the gel will form). It is equally well known that lowering the gelatin concentration makes the composition more difficult to gel (i.e. decreases the gelling temperature). This is shown in gelatin Compositions A and A/10 of FIG. 1.

The method of the present invention runs contrary to these usually observed phenomena in that the diluted gelatin solutions of this invention generally gel more easily, or at higher temperatures than do the gelatin concentrates from which they are made. This is shown in the comparisons in FIG. 1 of gelatin Compositions B-F with their diluted (tenfold) counterparts B/10-F/10.

More specifically, gel-set temperatures for three gelatin concentrates useful herein are shown in the graph of FIG. 1 for gelatin Compositions B, C and D. The gel-set temperatures of the diluted compositions (one volume to ten volumes) prepared from the above concentrations, Compositions B/10, C/10 and D/10, respectively are also illustrated. The gelatin and lyotrope (urea) concentrations are listed for each solution as is the weight ratio of gelatin-to-urea (G:U).

For purposes of comparison in FIG. 1, the gel-set temperature of an aqueous gelatin concentrate (Composition A) having the same amount of gelatin as concentrates B and C and no lyotropic agent is shown, as is the gel-set temperature of the diluted composition (A/10) made therefrom and having the same gelatin concentration as compositions B/10 and C/10. The gelatin used for each composition of FIG. 1 had a Bloom value of 280.

The gelatin concentrates of this invention gel at temperatures lower than normally expected for compositions containing an equal amount of gelatin because they contain urea, a non-acid lyotropic agent which prevents or retards gelation. While it is not desired to be bound by any particular theory or mechanism, it is believed that when the gelatin concentrate is diluted with water, the gelation retarding effect of the urea decreases more rapidly than does the gel retardation effect of lowered gelatin concentration. The usual result of these believed different rates of decreasing effects on gelling temperature is that once the concentration of gelatin is reached which is desired for a gelled product, the gel retarding effect of the urea is minimal and the product gels at a temperature near that expected for the gelatin alone.

The diluted compositions prepared in accordance with this invention usually, and preferably, gel at higher temperatures than do the concentrates from which they are prepared. Under some circumstances, however, the rise in gelling temperature usually observed in this invention can be overwhelmed by other phenomena and the diluted composition gels at a temperature equal to or below the gel-set temperature (discussed hereinafter) of the concentrate from which it is prepared. One such circumstance can occur when the concentrate is at a relatively high pH value, e.g. about pH 6-7, and the diluted product has a relatively low pH value, such as about 4 or below.

In the exceptional situations in which the diluted product has a gel-set temperature equal to or greater than the gel-set temperature of the concentrate from which it is made, the system is nevertheless within the ambit of this invention provided that either (1) the diluted composition has a gel-set temperature higher than about 10° C. (about 50° F.), or (2) the concentrate when diluted with water (rather than with an acid-containing aqueous composition) to a gelatin concentration of about 2 weight percent of the total composition, while maintaining substantially the pH value of the concentrate (e.g. within about 0.5 pH units) produces a diluted composition having a higher gel-set temperature than that of the concentrate from which it is prepared. This latter test is particularly useful in the above-discussed circumstance when the concentrate has a relatively high pH value and the pH value of the diluted composition is relatively low.

For ease of understanding, and clarity, the remainder of the discussion herein will deal with the preferred compositions wherein the diluted composition has a gel-set temperature above that of the concentrate from which it is prepared.

While the gelatin concentrates of this invention are normally liquid at ambient room temperatures, storage or shipment at below room temperatures, as during winter shipment, can cause the concentrates to gel. Should gelation of these concentrates occur, storage at or above ambient room temperature will generally cause the gelled concentrates to reliquify and return to their usable condition because there is usually only a difference of a few degrees, e.g. about 3° C., between their gelling and melting temperatures.

According to the instant invention, aqueous concentrates preferably containing from about 10 to about 30 weight percent gelatin are prepared and utilized. More preferably, and necessarily with gelatins of high gel strength (Bloom strength), the concentrates of this invention contain from about 15 to about 25 weight percent gelatin. The amount of gelatin is calculated on the basis of the solids content of the gelatin material used; i.e. as the amount of acid salt of the protein or as the amount of free protein used. These concentrates are liquid and ungelled at ambient temperatures, rather than being gelled; i.e., the concentrates have gel-set temperatures which are preferably less than about 20° C., and are more preferably less than about 15° C.

As used herein, the "gel-set temperature" is that temperature at which a composition containing gelatin will gel within the time required for all of the material to reach said temperature. This temperature is measured by slowly cooling an aqueous, gelatin-containing solution containing a thermometer and observing the temperature at which gelation occurs.

It is pointed out that the gel-set temperature and the temperature at which a gelled composition will reliquify or melt are usually quite different, with the melting temperature being higher. The gel-set temperatures of the concentrates useful herein usually are within about 5° F. (about 3° C.) of the melting temperature, while differences between gel-set and liquification temperatures of about 15°-30° F. (about 8°-17° C.) are not uncommon for the diluted compositions made in accordance with this invention and useful herein. Thus, even where dilution produces a relatively small rise in gel-set temperature over that of the concentrate, the difference in melting temperatures between a gelled concentrate and its diluted composition is usually larger. This larger separation of melting temperatures makes this invention useful even when the gel-set temperature of the diluted composition is raised slightly because if a concentrate happens to gel due to low temperature exposure, it will return to a liquid state easily by sufficient exposure to a temperature only a few degrees above its gel-set temperature, while the diluted composition, having a more stable gel form, will generally remain in the gelled state with the same exposure to a temperature above its gel-set temperatures.

The gelatin useful herein can be obtained from one or more animal sources as is known in the art. Collagen hydrolysis is typically carried out in hot water under acidic or neutral conditions from either acid or base cured collagen-containing sources. The hydrolyzed product is typically provided as an acid salt, e.g. hydrochloride or hydrosulfate, although salt-free, deionized, gelatins are also available. As the method and products of this invention are directed toward human consumption, food grade gelatin is used.

Bloom strengths or values are properties of the gelatins which relate to the gel strength or firmness which a particular gelatin produces under standardized conditions. The Bloom strength or value is based upon the force in grams required to cause a standardized piston to move through a standardized, gelled gelatin sample, and is used for rating the strength of gels. Gel strength is measured in commercially available machines called Bloom Gelometers. Higher Bloom strengths indicate higher gel strengths and higher gelling temperatures for a selected amount of gelatin.

A gelatin composition for measuring Bloom strength contains 7.5 grams of gelatin dissolved in 105 grams of water. The gelatin solution is allowed to gel and is kept at 50° F. (10° C.) for 17 hours prior to making the Bloom strength determination.

The gelatin-containing food product concentrates and therefore gelled food products can be prepared from gelatins having Bloom strengths of about 100 to about 350, but are preferably prepared from gelatin having a Bloom strength of from about 250 to about 300.

Since Bloom strengths or values are measured at specific solids concentrations, and the various diluted compositions described herein are generally not at those required solids concentrations, the measures of gel firmness reported herein for diluted compositions are not in Bloom values. Rather, gel firmness values are given in terms of "gel strength" which is the number of grams required to move the piston of a Bloom Gelometer through the gelled, diluted composition being measured, using the same time and temperature conditions used for measuring Bloom values.

It is known that a series of gelled products having a constant gel strength can be prepared from gelatins of differing Bloom values by suitably adjusting the concentrations of the gelatin used for the composition, and the pH value of each composition. For example, use of one amount of a gelatin having a high Bloom value can produce a gelled product whose gel strength is the same as that of a gelled product prepared by using a higher concentration of a gelatin that has a lower Bloom value. This effect is illustrated in part by the gel strength versus pH value plots of FIG. 5 wherein gelatin having Bloom values of 310 and 280 were used, the ordinate of the plots of FIG. 5 being in gel strength units.

A non-acid lyotropic agent (lyotrope) also constitutes a portion of the concentrates of this invention. The lyotrope useful herein is urea, which is a neutral compound, acting as neither an acid or a base, and thus does not cause a substantial effect, if any, upon the pH value of the concentrate or the gelled food product. Consequently, the lyotrope of this invention causes substantially no effect upon the pH values of the system as compared to the acidic lyotropes disclosed in U.S. Pat. No. 4,224,353 which make the syrups of that invention so acidic that those syrups must be stored in a refrigerated condition to avoid hydrolysis of the gelatin therein. In addition, urea adds substantially no taste to the food product which must be masked by amounts of flavorants in excess of those normally found in gelled food products which contain no urea, and urea is a naturally occurring metabolite which is excreted by the kidneys.

The ratio of gelatin-to-urea (G:U) in the concentrate has an effect on the gel-set temperature of both the concentrate and the diluted composition prepared therefrom. If too little urea is used, the gel-set temperature of the concentrate will not be low enough, and the concentrate may gel at temperatures above 20° C. If too much urea is used, the diluted composition having the prescribed gelatin concentration may not gel at the temperature desired for a gelled food product.

The weight of gelatin to that of urea preferably is in a ratio of about 1:0.3 to about 1:1.5, and more preferably, this weight ratio is about 1:0.6 to 1:1.1. It is stressed that the weight ratio of gelatin-to-urea does not change by mere dilution with water and typically remains constant in both the concentrate and diluted composition, but the lyotropic effect is noted substantially only in the concentrate. The constancy of the gelatin-to-urea (lyotrope) weight ratio herein is contrasted with the disclosures of U.S. Pat. No. 4,224,353 wherein the lyotrope, the acid pH-causing proton, is consumed by the buffer during the pH raising step when the dessert product of that patent is prepared. Additional amounts of gelatin and/or urea can be added during the dilution step to alter the gelatin-to-urea ratio so long as that ratio remains within the above-stated range.

As can be seen from examination of the plots of the graphs of FIGS. 2 and 3, where gelatin was used, the Bloom value of the gelatin selected for use in a concentrate plays a role in determining the gel-set temperature of the concentrate, and in selecting the gelatin-to-urea weight ratio. It is generally preferred to use more urea with gelatins having higher Bloom values.

In FIG. 2, gel-set temperatures are plotted for 100 and 300 Bloom gelatin concentrates wherein the gelatin concentration is a constant 22 weight percent of the aqueous concentrate and the weight of urea as lyotrope is changed from zero through about 1.25 times the amount of gelatin present in the concentrate. While the decreases in gel-set temperatures are approximately the same for a given weight ratio of gelatin-to-urea, the gelatin with the Bloom value of 100 exhibits a gel-set temperature which is consistently about 9° C. lower than the gel-set temperature for the gelatin having a Bloom value of 300, for the range shown in the graph.

In FIG. 3, the amount of gelatin is kept constant at 22.5 weight percent as is the weight ratio of gelatin-to-urea kept at 1:0.995, while the gel-set temperature is plotted against the Bloom value of the gelatin utilized in the concentrate. Here again, the higher Bloom values go hand-in-hand with the higher gel-set temperatures for the amount of gelatin and gelatin-to-urea weight ratio used.

The pH value of the concentrate and of the diluted composition affect the gel-set temperature of the concentrate and the gel strength of the gelled, diluted composition. This is shown in FIGS. 4 and 5 for gelatin-containing concentrates and diluted compositions, respectively, which contain urea as the lyotropic agent.

In FIG. 4, it is seen that increasing the pH value above about pH 4.2 for aqueous concentrates containing 22.5 weight percent gelatin (310 Bloom), and a gelatin-to-urea weight ratio of 1:0.996, steadily increases the gel-set temperature. FIG. 5 shows that increasing the pH value of the concentrates of FIG. 4 which have been diluted one volume to ten volumes (2.25 weight percent gelatin), and therefore of the diluted compositions, increases the gel strength of the gelled food product to a point at which the gel strength levels to a relatively constant value.

It is thus seen that, for best results, there is some benefit in controlling the pH value for both the concentrates and diluted compositions. The pH value in general, is preferably below about pH 6 in the concentrate so that that composition maintains its low gel-set temperature. The pH value of the diluted composition is generally preferred to be below about pH 5.5 so that some control of the diluted composition's gel strength can be exercised. While useful concentrates and diluted, gelled products can also be prepared within the entire range of pH values from about 2.5 to about 7, it is preferred that the pH value of both the concentrate and diluted composition be between about 3.5 and about 5.5, as this pH value range helps to maintain stability of the composition to hydrolysis during storage at room temperature. More preferably, the pH value of both the concentrates and diluted compositions, and therefore products, is between about 4 and about 5.

After preparation of the gelatin concentrate, it is preferably diluted for use with an aqueous composition to a gelatin concentration of from about 1 to about 5 weight percent of the resulting, diluted composition. More preferably, the diluted composition and gelled food product contain about 1 to about 3.5 weight percent gelatin. The diluted composition thus produced preferably has a higher gel-set temperature than does the concentrate, and when maintained for a sufficient time at a temperature not higher than its gel-set temperature, the diluted composition forms a gel.

Food acids, such as citric acid, malic acid, fumaric acid, hydrochloric acid and the like, are useful herein to help provide the desired concentrate and diluted product pH values, and more importantly, as flavorants. The amount of food acid so utilized is typically less than about 20 percent of the weight of the gelatin present and less than about 10 percent of the weight of the concentrate. At such concentrations, food acids provide little, if any, lyotropicity.

While it is preferred that the concentrate have a pH value of about 3.5 to about 5.5 so that room temperature stability toward hydrolysis can be maintained, the concentrates of this invention which contain food acids can also have pH values in the range of about 2.5 to about 5.5. At about the time of dilution (e.g. before, after or during dilution) of the latter, low pH value concentrates with an aqueous composition for use in a gelled food product, the pH value of the diluted composition is preferably raised by admixing therewith an appropriate edible, alkaline material to preferably between about 3.5 to about 5.5, and more preferably to a pH value of between about 4 to about 5.

Alkaline materials useful for raising the pH values of the diluted compositions are water-soluble alkaline materials which are edible or which produce edible salts when admixed with the gelatin concentrate, including constituents of the concentrate such as food acids, and include sodium or potassium hydroxides, carbonates, bicarbonates, and phosphates, such as sodium dihydrogen phosphate, dipotassium hydrogen phosphate and trisodium phosphate, and the like, and mixtures thereof. Since the concentrates of this invention do not contain sufficient amounts of food acid to cause lyotropicity, the metallic taste observed from neutralized gelatin syrups in which food acids are the lyotrope is not observed herein.

When sodium or potassium carbonates or bicarbonates are added to the acidic, gelatin-containing concentrates during the dilution step, the diluted composition emits bubbles of carbon dioxide due to the reaction of the acid and carbonate or bicarbonate salt. If the diluted composition is gelled quickly, as when cold water is used for the dilution step, and/or the diluted composition is refrigerated rapidly, the carbon dioxide gas bubbles can be trapped in the gelled, diluted composition to prepare a foamed, gelled food product whose bubbles contain a higher concentration of carbon dioxide than is present in the air, and which does not require beating and air entrapment to prepare a foam.

The natural buffering effect of food acid and food acid salts present on dilution tends to keep the pH value of the diluted compositions within the preferred range of pH values with most ordinary tap waters. Additional buffering agents such as sodium dihydrogen phosphate and disodium hydrogen phosphate can also be used to assist in buffering the concentrates and diluted compositions.

The aqueous gelatin concentrates of this invention, when used for dessert-type gelled food products, are more preferably diluted to a gelatin concentration of about 1 to about 3.5 weight percent of the total composition. Concentrates for preparing dessert-type gelled food products also typically contain natural or artificial fruit or berry flavorants such as strawberry, raspberry, orange, lime or grape concentrates, or the like, in sufficient amounts to flavor the gelled food product. When fruit or berry flavorants are used, an edible food colorant such as is normally associated with the fruit or berry is also typically present, e.g. red for raspberry or green for lime flavor. As previously discussed, food acids such as fumaric acid, citric acid, adipic acid, and the like which provide tartness and buffering capacity are present in the dessert compositions of this invention alone or in mixtures, at a concentration of about 1 to about 10 weight percent of the concentrate.

Natural or synthetic sweeteners such as sucrose, fructose, mannitol, sorbitol or saccharin derivatives, such as sodium saccharin, sodium cyclamate and aspartame are also preferably present. The sweeteners can also be used alone or in mixtures in an amount sufficient to provide the desired sweetening effect. Food preservatives such as sodium benzoate and potassium sorbate can also be present in the gelatin-containing concentrates of this invention.

When natural sweeteners are used, the gelatin concentrates of this invention are most conveniently utilized in gelled food precursor products comprised of at least two packages or containers; one package containing the gelatin concentrate prepared from water, gelatin, edible lyotropic agent, and the like, with the second package containing an aqueous natural sweetener concentrate, such as a 65 weight percent solution of sucrose or a 90 weight percent solution of fructose. The two package system for this type of gelled food product precursor is preferred because inclusion of the desired amount of natural sweetener in the concentrate frequently leads to a thickened, but ungelled, concentrate which is not very fluid.

As is well known, natural sweeteners differ in their sweetening abilities, solubilities and viscosities, and consequently, the amount of sweetener in the natural sweetener-containing concentrate will vary as to the particular natural sweetener used. The amount of aqueous natural sweetener in the aqueous natural sweetener-containing concentrate is therefore that amount which, upon dilution, sufficiently sweetens the diluted composition and gelled product.

The separate package for the aqueous natural sweetener-containing concentrate can also contain, mixed therein, the alkaline material used to raise the pH value of diluted compositions, as when food acids are utilized to impart tartness and/or provide acid for a foamed product. In preferred practice, monosaccharides, such as glucose, are not used in conjunction with the alkaline material because their admixture causes an undesirable reaction which leads to a reduction in sweetening power. The sweetener-containing package can also contain a food acid to lower the pH value of the diluted composition.

In those instances where an artificial sweetener, such as aspartame or sodium saccharin, is used in the presence of food acid, the first package can contain water, gelatin, food acid and artificial sweetener, while the second package contains an aqueous solution of edible alkaline material. If desired, additional packages containing other gelled food product constituents, such as food acid or flavorant can also be used. With artificial sweeteners, all components can be housed in a single package.

When the food product gelatin-containing concentrate of this invention is housed in one container, such as a bottle, and at least one other product constituent is housed in at least one other container, such as another bottle, the hereinbefore given weight percentages of the concentrate components are calculated based upon the weight of the contents of the gelatin-containing container. The amount of gelatin in the diluted composition in its liquid and gelled forms is calculated based upon the total weight of the total, diluted, composition.

When the desired, gelatin-containing gelled food product is an aspic, rather than a dessert, the food acid and sweetener are not used. Instead, a package, or packages, other than that containing the gelatin concentrate can contain one or more flavoring materials suitable for aspics, such as tomato juice or concentrate, beef broth, clam broth, and table salt. The flavorant for the aspic can also be packaged with the gelatin concentrate.

One convenient form for packaging one, two or multi-package food product precursors of this invention is in heat-sealable, plastic, foil laminate or plastic lined, flexible envelopes. These envelopes are conveniently used by clipping off a corner or tearing the seal open and squeezing or pouring out the premeasured contents.

Using a dessert-type, gelatin-containing product precursor as exemplary, after opening and emptying the package contents into a bowl, admixing the gelatin concentrate and the aqueous natural sweetener-containing concentrate partially dilutes the gelatin concentrate. The package contents are mixed with sufficient water to obtain the diluted gelatin concentration desired for the gelled food product, as described previously. Admixture of the aqueous natural sweetener-containing concentrate and the gelatin-containing concentrate preferably occurs prior to admixture with water to form the diluted composition. However, the gelatin concentrate and water can be admixed first, followed by admixture of the natural sweetener-containing concentrate. Gelation is then allowed to occur, as by refrigeration.

This invention, as explained before, eliminates the need for hot water dissolution of solid gelatin when gelatin desserts are prepared and thus shortens the cooling time necessary to reach gelation temperatures after the dessert preparation is put into a refrigerator. Through the use of this invention, it is possible to dilute a concentrate shortly before dinner and have a gelled product after dinner.

For dilution of all of the concentrates discussed hereinbefore, the temperature of the aqueous composition used for dilution can range from cold through hot. Cold water generally requires more stirring to effect formation of a substantially homogeneous diluted composition, and the composition so produced requires a relatively short time to gel. When hot water is used, the stirring time is shortened, but more time is required for cooling to gelation temperatures to occur. In preferred practice, tepid water is used when the shortest gelling time is not essential.

The concentrate compositions of this invention can be prepared from dried gelatin or from gelatin liquors. In a typical preparation, 250-300 Bloom gelatin liquor containing 29-32 weight percent solids at a temperature of 160° F. (about 71° C.) is added to a Dopp Kettle or equivalent mixer. The desired amount of urea and other ingredients are then added thereto and mixed in slowly while the temperature of the resulting admixture is maintained at about 140°-150° F. (about 60°-65.5° C.). After the principal ingredients have been dissolved, the pH value of the composition is adjusted, if necessary. The admixture is then cooled to about ambient temperature (20°-25° C.) and filled into suitable containers.

To prepare a preferred gelled gelatin-containing food product according to the method of this invention, an illustrative concentrate is provided, such as the one above, or any other ungelled concentrate, having a gel-set temperature less than about 20° C., comprising water, about 10 to about 30 weight percent gelatin, and urea, and having a pH value of about 3.5 to about 5.5 and a gelatin-to-urea weight ratio of about 1:0.3 to about 1:1.5. The concentrate is then diluted with an aqueous composition to provide a composition having a gelatin concentration of about 1 to about 5 weight percent of the total weight of the gelled food product. The diluted composition is thereafter maintained at a temperature of less than its gel-set temperature, e.g. less than about 20° C., to form a gel. If the diluted composition is cool or cold when prepared, it normally takes only a short time for gelation to take place, especially when the composition is placed in a refrigerator.

This invention is further illustrated by the examples which follow.

BEST MODE FOR CARRYING OUT THE INVENTION

Example 1: Gelatin Dessert Concentrate With Artificial Sweetener

|  | Component List | Weight Percent |
|---|---|---|
| (1) | Water | 42.7 |
| (2) | Gelatin-HCl, 250 Bloom (95% solids) | 26.4 |
| (3) | Urea (98% solids) | 18.9 |
| (4) | Fumaric acid | 4.0 |
| (5) | Sodium citrate | 1.8 |
| (6) | Sodium benzoate | 0.05 |
| (7) | Potassium sorbate | 0.05 |
| (8) | Strawberry flavor concentrate | 1.4 |
| (9) | Red food color | 1.4 |
| (10) | Sodium hydroxide (as 25% solution) | 3.0 |
| (11) | Saccharin solids | 0.3 |
|  |  | 100.0 |

The components numbered 2–7 in the above list were first blended together while dry. The components numbered 8 and 9, which are liquids, were thereafter admixed and blended with the dry blend of components 2–7 to form a new blend. Water (component 1) was thereafter admixed with agitation to the new blend and the resulting concentrate was heated with continued agitation to about 140° F. (60° C.) Agitation was continued with maintenance of a temperature of about 140° F. (60° C.) until a substantially homogeneous concentrate was prepared. Sodium hydroxide (component 10) was thereafter added to adjust the pH value of the concentrate and the saccharin solids, dissolved in water (component 11) was added and mixed into the composition. The amount of water noted in the above Component List is that which was added as water and does not include that water which may be contained in one of the other components, e.g. gelatin, urea, flavor concentrate, etc.

After cooling, the aqueous gelatin concentrate had a pH value of 4.5, and had a gel-set temperature of 10° C. Dilution and mixing of one volume of the concentrate to ten volumes with City of Chicago tap water produced a gelatin dessert composition which had a gel-set temperature of 13.5° C.

Example 2: Gelatin Concentrate

A gelatin concentrate useful in preparing the gelled food product of this invention when combined with other ingredients was prepared as follows: A gelatin liquor (75.3 pounds) containing 29.77 weight percent 280 Bloom gelatin-HCl was mixed with urea (22.0 pounds at 98% purity) at a temperature of 65° C. The pH value of the composition was 4.3, and a total of 2.7 pounds of additional water were added with mixing to form a substantially homogeneous concentrate.

The concentrate so produced contained 22.4 weight percent gelatin and had a gelatin-to-urea weight ratio of 1:0.96. This concentrate had a gel-set temperature of 8°

C. When diluted to contain 2.24 weight percent gelatin, the diluted and subsequently mixed composition had a gel-set temperature of 14° C.

Example 3: Two Package Concentrate Containing Natural Sweetener

| | Component List | Weight Percent |
|---|---|---|
| | First Solution | |
| (1) | Water | 43.55 |
| (2) | Gelatin-HCl, 250 Bloom (95% solids) | 28.0 |
| (3) | Urea (98% solids) | 20.0 |
| (4) | Fumaric acid | 1.7 |
| (5) | Citric acid | 2.0 |
| (6) | Sodium citrate (85% solids) | 2.5 |
| (7) | Sodium benzoate | 0.05 |
| (8) | Potassium sorbate | 0.05 |
| (9) | Strawberry flavor concentrate | 1.3 |
| (10) | Red food color | 0.85 |
| | | 100.0 |
| | Second Solution | |
| | Sucrose, 65% aqueous | |

The concentrate portion of the first package was prepared as described in Example 1. This composition had a pH value of 3.9–4.0, had a gel-set temperature of 55° F. (12.5° C.), and a gelatin-to-urea weight ratio of 1:0.74.

30 Grams of the first solution were packaged as were 56 grams of the second solution. The packages were opened and their contents poured into a measuring cup to yield 28.5 grams and 55.0 grams, respectively. Sufficient tepid tap water (166.5 grams) was added with stirring to prepare one cup of liquid (250 grams, total). The resulting diluted composition had a gel-set temperature of 61° F. (16.1° C.) and a pH value of 4.0.

A similar orange flavored concentrate was prepared by replacing the strawberry flavor concentrate and red food color with 1.8 weight percent orange flavor and 0.85 percent of orange food color, respectively. A total of 43.05 weight percent added water was used. This composition had the same gel-set and pH values as described above.

A two package gelled food product was prepared using a 90% aqueous fructose solution as the sweetener. For this product, a package containing 40 grams of the fructose solution was poured into the measuring cup and yielded 39.2 grams. Another package containing 30 grams of the first solution was prepared and emptied into the cup to yield 28.5 grams. Thereafter, a total of 182.3 grams of tepid tap water were added to bring the diluted composition to one cup (250 grams, total). This diluted composition also had a pH value of 4.0 and gel-set temperature of 61° F. (16.1° C.).

All of the above gelled products were eaten, and could not be distinguished in taste or gel characteristics from similar products prepared from dried gelatin.

Example 4: Gelatin Concentrates and Compositions From FIGS. 4 and 5

The concentrates containing gelatin and urea whose gel-set temperatures as a function of pH are illustrated in FIG. 4 also contained small amounts of fumaric acid and sodium citrate as a pH adjusting buffer system and to impart tartness to the diluted, gelled dessert-type product. The buffer system components used to prepare the concentrates whose gel-set temperatures correspond to the points of the graph of FIG. 4 are shown in Table 1 below. Gel strength values for the diluted compositions, prepared from the concentrates, illustrated in FIG. 5, are listed in Table 2 as are the gel-set temperatures and taste characteristics for these diluted compositions.

TABLE 1*
Compositions Containing 22.5 Percent Gelatin and 22.4 Percent Urea

| Concentrate | Fumaric Acid | Sodium Citrate | pH | Gel-Set Temp. (° C.) |
|---|---|---|---|---|
| 1 | 2.0 | 0 | 3.25 | 10–12 |
| 2 | 2.0 | 1.0 | 3.6 | 10–12 |
| 3 | 2.0 | 1.5 | 3.8 | 10–12 |
| 4 | 2.0 | 2.0 | 4.1 | 10–12 |
| 5 | 2.0 | 2.5 | 4.2 | 10–12 |
| 6 | 1.0 | 1.0 | 4.3 | 12–14 |
| 7 | 1.0 | 2.0 | 4.7 | 13–15 |
| 8 | 0 | 2.0 | 5.7 | 15–18 |

*The amounts of fumaric acid and sodium citrate are given in weight percentages based on the total weight of the concentrates.

TABLE 2**
Proportion of Diluted Compositions Prepared from Table 1 Concentrates

| Diluted Concentrate | pH | Gel Strength Value | Taste |
|---|---|---|---|
| 1 | 3.25 | 28 | Acid |
| 2 | 3.6 | 32 | Acid |
| 3 | 3.8 | 34 | Bitter |
| 4 | 4.1 | 38 | Bitter |
| 5 | 4.2 | 38 | Bitter |
| 6 | 4.3 | 39–40 | Tartness fading |
| 7 | 4.7 | 40 | Slightly tart |
| 8 | 5.7 | 40 | Alkaline |

**The concentrates were diluted one volume to ten volumes to provide 2.25 weight percent gelatin in the diluted composition.

EXAMPLE 5: Further Two Package Dessert-Type Gelled Food Products

Two additional two package, gelled dessert-type food product precursors (Products A and B) for the preparation of products similar to that of Example 3 were prepared as follows:

| | Component List | Products A | (Weight Percent) B |
|---|---|---|---|
| | First Solution | | |
| (1) | Gelatin Hcl, 250 Bloom | 26 | 25.74 |
| (2) | Urea | 25 | 20.80 |
| (3) | Sodium benzoate | 0.05 | 0.05 |
| (4) | Potassium sorbate | 0.05 | 0.05 |
| (5) | Sodium citrate (85% active) | — | 2.18 |
| (6) | Strawberry flavor concentrate | — | 0.69 |
| (7) | Strawberry flavor concentrate | — | 0.49 |
| (8) | Water | 48.9 | 50.00 |
| | | 100.00 | 100.00 |
| | pH | 4.9 | 5.8 |
| | Second Solution | | |
| (9) | Sucrose (granular) | 66.00 | 66.00 |
| (10) | Citric acid | 0.53 | 0.53 |
| (11) | Malic acid | 0.47 | 0.47 |
| (12) | Sodium citrate (85% active) | 0.65 | — |
| (13) | Strawberry flavor concentrate | 0.21 | — |
| (14) | Strawberry color concentrate | 0.15 | — |

| | Component List | Products (Weight Percent) A | B |
|---|---|---|---|
| (15) | Water | 31.99 | 33.00 |
| | | 100.00 | 100.00 |
| | pH | 4.1 | 2.5 |

The First Solution for each gelled product precursor was prepared by adding the requisite amount of water to the dry ingredients (components 3–5), followed by heating with agitation to about 60° C. The heated admixture was then agitated until substantially homogeneous and all of the ingredients had dissolved. The resulting solution was cooled with agitation to about room temperature and the coloring and flavorant admixed (Product B). Entrapped air bubbles were removed during the cooling step. The cooled solutions were then sealed in individual pouches, each containing 17.5 grams of the First Solution. The gel-set temperature for the First Solution of Product A was 62° F., while that for Product B was 61° F.

The Second Solution for each gelled product precursor was prepared by adding all of the solid components (9–11, and 12 for Product A) to the water (component 15). The resulting admixture was heated with agitation to about 50°–60° C. until all of the ingredients had dissolved and the solution was substantially homogeneous. The homogeneous solution was then cooled to ambient, room temperature. Components 13 and 14 were added to the cooled Second Solution of Product A. Each of the Second Solutions was then sealed in an individual pouch at 60.0 grams per pouch.

Gelled food products were prepared by opening the individual pouches (First and Second Solutions) for each product, and mixing their contents with sufficient tepid water (172.5 grams) to make one cup of liquid. The thus diluted Products A and B were then refrigerated to form gelled desserts. The gelled products had gel-set temperatures of 60° F.

The present invention has been described generally and with respect to preferred embodiments. It will be clear to those skilled in the art that modifications and/or variations of the disclosed methods and compositions may be made without departing from the scope of the invention set forth herein. The invention is defined by the claims which follow.

What is claimed is:

1. A method of preparing a gelled food product comprising the steps of:
   providing an ungelled aqueous gelatin concentrate comprising about 10 to about 30 weight percent gelatin and urea, the weight ratio of said gelatin to said urea being about 1:0.3 to about 1:1.5, said concentrate having a gel-set temperature less than about 20° C. and a pH value of between about 2.5 and about 7, and having the property whereby dilution thereof with water to a gelatin concentration of about 2 weight percent of the total composition while maintaining substantially the pH value of the concentrate produces a diluted composition having a gel-set temperature higher than that of said concentrate; and
   diluting said gelatin concentrate with an aqueous composition to a gelatin concentration of about 1 to about 5 weight percent of the total composition, and maintaining said diluted composition at a temperature not higher than said diluted composition gel-set temperature for a period of time sufficient to produce a gel.

2. A method of preparing a gelled food product comprising the steps of:
   providing an ungelled aqueous gelatin concentrate having a gel-set temperature less than about 20° C. comprising about 10 to about 30 weight percent gelatin and urea, the weight ratio of said gelatin to said urea being about 1:0.3 to about 1:1.5, and the pH value of said said concentrate being between about 2.5 and about 7; and
   diluting said gelatin concentrate with an aqueous composition to a gelatin concentration of about 1 to about 5 weight percent of the total composition, said diluted composition having a gel-set temperature greater than the lower of about 10° C. and the gel-set temperature of said gelatin concentrate, and maintaining said diluted composition at a temperature not higher than said diluted composition gel-set temperature for a period of time sufficient to produce a gel.

3. A method of preparing a gelled food product comprising the steps of:
   providing an ungelled aqueous gelatin concentrate having a gel-set temperature less than about 20° C. comprising about 10 to about 30 weight percent gelatin and urea, the weight ratio of said gelatin to said urea being about 1:0.3 to about 1:1.5, and the pH value of said said concentrate being between about 2.5 and about 7; and
   diluting said gelatin concentrate with an aqueous composition to a gelatin concentration of about 1 to about 5 weight percent of the total composition, said diluted composition having a gel-set temperature greater than the gel-set temperature of said gelatin concentrate, and maintaining said diluted composition at a temperature not higher than said diluted composition gel-set temperature for a period of time sufficient to produce a gel.

4. The method according to claim 3 wherein the weight ratio of said gelatin to said urea is about 1:0.6 to about 1:1.1.

5. The method according to claim 3 wherein said gelatin has a Bloom strength of from about 100 to about 350.

6. The method according to claim 3 wherein said gelatin concentrate has a pH value of between about 3.5 and about 5.5.

7. The method according to claim 3 wherein said gelatin concentrate has a pH value of between about 4 and about 5.

8. The method according to claim 6 wherein the pH value of the diluted composition is adjusted to between about 3.5 and about 5.5 by admixing therewith an edible alkaline material.

9. The method according to claim 8 wherein said edible alkaline material is selected from the group consisting of sodium and potassium hydroxides, carbonates, bicarbonates, and phosphates and mixtures thereof.

10. The method according to claim 3 comprising the additional step of admixing an aqueous natural sweetener concentrate to partially dilute said gelatin concentrate.

11. The method according to claim 10 wherein said aqueous natural sweetener composition includes an edible alkaline material.

12. The method according to claim 11 wherein said gelatin concentrate and said natural sweetener concentrate are admixed prior to said dilution with said aqueous composition.

13. The method according to claim 3 wherein said gelatin concentrate additionally comprises a flavorant, food acid and sweetener.

14. The method according to claim 13 wherein said sweetener is an artificial sweetener.

15. The method according to claim 3 wherein said concentrate contains from about 15 to about 25 weight percent gelatin.

16. The method according to claim 3 wherein said gelatin has a Bloom strength of from about 250 to about 300.

17. A method of preparing a gelled food product comprising the steps of:
    providing an aqueous ungelled gelatin concentrate having a gel-set temperature less than about 20° C. comprising about 10 to about 30 weight percent gelatin having a Bloom strength of from about 250 to about 300, urea, flavorant, food acid and sweetener, the weight ratio of said gelatin to said urea being about 1:0.6 to about 1:1 and the pH value of said concentrate being between about 4 and about 5; and
    diluting said gelatin concentrate with water to a gelatin concentration of about 1 to about 3.5 weight percent of the aqueous portion of the total composition having a gel-set temperature higher than the gel-set temperature of said gelatin concentrate, and maintaining said diluted composition at a temperature not higher than said diluted composition gel-set temperature for a period of time sufficient to produce a gel.

18. A method of preparing a gelled dessert comprising the steps of:
    providing an aqueous ungelled gelatin concentrate in a first package, the contents of said first package comprising water, about 10 to about 30 weight percent gelatin having a Bloom strength of from about 250 to about 300, and urea, the weight ratio of said gelatin to said urea being about 1:0.3 to about 1:1.5, said gelatin concentrate having a gel-set temperature less than about 20° C., and a pH value of between about 2.5 and about 5.5;
    providing a second package containing an aqueous solution of at least one other constituent of said gelled food product;
    opening said first and second packages and admixing the contents thereof with sufficient water to dilute said gelatin to a concentration of about 1 to about 3.5 weight percent of the resulting, diluted composition, said diluted composition having a pH value of between about 4 and about 5 and gel-set temperature higher than the gel-set temperature of said gelatin concentrate; and
    maintaining said diluted composition at a temperature not higher than said diluted composition gel-set temperature for a period of time sufficient to produce a gel.

19. The method according to claim 18 wherein said aqueous solution of said second package comprises a water-soluble alkaline material, said alkaline material being edible or becoming edible when admixed with the contents of said first package.

20. The method according to claim 19 wherein said alkaline material is selected from the group consisting of sodium and potassium carbonates, and bicarbonates and mixtures thereof, and said diluted composition is gelled quickly to trap carbon dioxide bubbles emitted therein to thereby prepare a foamed, gelled food product.

21. The method according to claim 18 wherein said aqueous solution of second package comprises a natural sweetener concentrate.

22. An ungelled aqueous gelatin concentrate for preparing a gelled food product comprising about 10 to about 30 weight percent gelatin, urea, and at least one flavoring agent, the weight ratio of said gelatin to said urea being about 1:0.3 to about 1:1.5, said gelatin concentrate having a gel-set temperature less than about 20° C. and a pH value of between about 2.5 and about 7, and after dilution with water to a gelatin content of about 2 weight percent of the total composition while maintaining the pH value of the concentrate having a gel-set temperature greater than the gel-set temperature of said gelatin concentrate prior to dilution.

23. The concentrate according to claim 22 wherein said gelatin has a Bloom strength of from about 100 to about 350.

24. The concentrate according to claim 22 wherein upon dilution with an aqueous composition to a pH value of between about 3.5 and about 5.5 and a gelatin concentration of about 1 to about 3.5 weight percent of the total composition, the resulting diluted composition has a gel-set temperature higher than the lower of about 10° C. and the gel-set temperature of said concentrate.

25. The concentrate according to claim 22 wherein said weight ratio of gelatin-to-urea is about 1:0.6 to about 1:1.

26. The concentrate according to claim 22 wherein said gelled food product is an aspic and said flavoring agent includes table salt.

27. The concentrate according to claim 22 wherein said gelled food product is a dessert product and said flavoring agent includes a food acid and a fruit or berry flavorant.

28. The concentrate according to claim 27 having a pH value between about 4 to about 5.

29. An ungelled aqueous gelatin concentrate for preparing a gelled, dessert-type food product comprising about 10 to about 30 weight percent gelatin having a Bloom strength of from about 250 to about 300, urea, food acid, flavorant and sweetener, the weight ratio of said gelatin to said urea being about 1:0.6 to about 1:1.1, said gelatin concentrate having a gel-set temperature less than about 20° C. and a pH value of between about 3.5 and about 5.5, and after dilution with water to a gelatin content of about 1 to about 3.5 weight percent, having a gel-set temperature greater than the gel-set temperature of said gelatin concentrate prior to dilution.

30. The concentrate according to claim 29 wherein said sweetener is an artificial sweetener.

31. A precursor for a gelled food product comprising at least a first and a second package,
    the first of said packages containing a gelatin concentrate comprising water, about 10 to about 30 weight percent gelatin, and urea, the weight ratio of gelatin-to-urea being about 1:0.6 to about 1:1.1, said concentrate having a gel-set temperature less than about 20° C. and a pH value between about 3.5 and about 5.5; and
    the second of said packages containing an aqueous natural sweetener concentrate, the concentration of said natural sweetener being sufficient to sweeten the gelled food product resulting from admixture of the contents of said packages, dilution of said admixture to a gelatin concentration of about 1 to about 3.5 weight percent, and gelation of the diluted composition.

32. The gelled food precursor product according to claim 31 additionally comprising a fruit or berry flavorant.

33. A precursor for a gelled food product comprising at least a first and second package, the first of said packages containing a gelatin concentrate comprising water, about 10 to about 30 weight percent gelatin, urea and food acid, the weight ratio of said gelatin to said urea being about 1:0.6 to about 1:1.5, said gelatin concentrate having a gel-set temperature less than about 20° C. and a the pH value between about 2.5 and about 5.5; and the second of said packages containing an aqueous natural sweetener concentrate containing sufficient natural sweetener to sweeten the gelled food product resulting from admixture of the contents of said packages, said second package additionally containing an edible, water-soluble alkaline material present in an amount sufficient to raise the pH value of said diluted composition to between about 3.5 and about 5.5 when said admixture is diluted with sufficient water to provide a gelatin concentration of about 1 to about 3.5 weight percent.

34. A gelled food product comprising water, about 1 to about 5 weight percent gelatin and urea, the weight ratio of said gelatin to said urea being about 1:0.3 to about 1:1.5, the gelatin of said product being in a gelled state.

35. The gelled food product according to claim 34 wherein said gelled product is a foam whose bubbles contain a higher concentration of carbon dioxide than is present in the air.

36. The gelled food product according to claim 34 additionally comprising sweetener and berry or fruit flavorant.

37. The gelled food product according to claim 34 additionally comprising food acid.

38. A foamed, gelled food product comprising water and about 1 to about 3.5 weight percent gelatin, the bubbles of said foam containing a higher concentration of carbon dioxide than is present in the air.

* * * * *